J. C. KOPF.
MECHANICAL MOVEMENT.
APPLICATION FILED MAY 15, 1919.
1,318,770.
Patented Oct. 14, 1919.
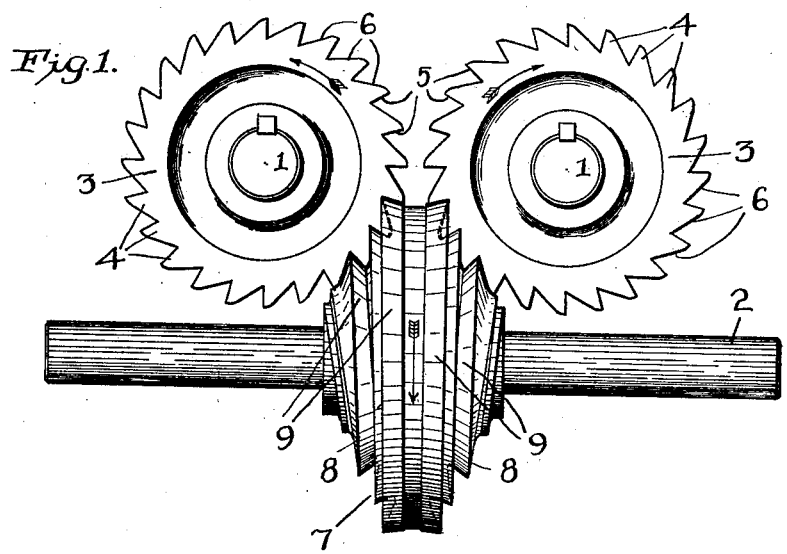
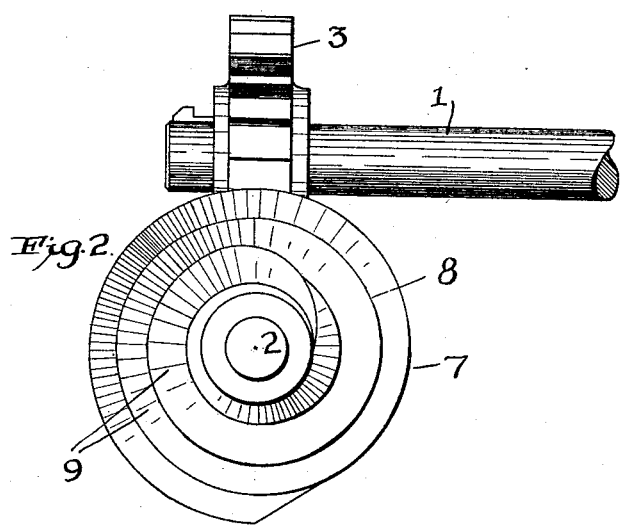
INVENTOR.
John C. Kopf
BY
ATTORNEY.

UNITED STATES PATENT OFFICE.

JOHN C. KOPF, OF BELLEVUE BOROUGH, PENNSYLVANIA, ASSIGNOR TO THE DUFF MANUFACTURING COMPANY, OF PITTSBURGH, PENNSYLVANIA, A CORPORATION OF PENNSYLVANIA.

MECHANICAL MOVEMENT.

1,318,770.           Specification of Letters Patent.      Patented Oct. 14, 1919.

Application filed May 15, 1919. Serial No. 297,238.

*To all whom it may concern:*

Be it known that I, JOHN C. KOPF, a citizen of the United States, and resident of the borough of Bellevue, county of Allegheny, State of Pennsylvania, have invented a new and useful Improvement in Mechanical Movements, of which the following is a specification.

The invention relates to mechanical movements, and the object is to provide a powerful, slow-motion, self-locking drive, simple to manufacture, and characterized by great strength and high efficiency. A pair of gears having straight buttress teeth upon the peripheries are driven by a double spiral buttress pinion having a helical pitch auxiliary to its spiral pitch, so that the working face pursues the teeth of the buttress gears through a substantial arc of their movement, the driving effect being thus exerted upon two series of teeth upon the gears simultaneously. The working face of the pinion may be described as a broad and low concave conical spiral, comprising a plurality of convolutions. The greater spiral pitch and the lesser helical pitch, as also the working face angle, vary throughout, in such manner that the working face has simultaneous driving engagement with the series of gear teeth, as stated. This gearing is self-locking against reverse operation, as is a worm gearing, but is essentially distinguished from the latter in acting radially instead of axially with respect to the driving shaft, in exhibiting line contact instead of face contact, in extent of engagement between the driving and driven members, and in absence of axial or end-thrust reaction in the driving member and shaft. Because of the great strength of the buttress construction in both members and the conical form of the pinion, the distribution of driving effort, the large angle of efficiency, and the reduction in friction, the gearing is advantageous for all mechanisms in which heavy loads are to be moved or great resistances overcome.

In the accompanying drawings forming a part hereof:

Figure 1 is a view in side elevation of the driving member and in end elevation of the driven members; and Fig. 2 is an elevation at right angles to Fig. 1, with one of the driven members omitted.

Figs. 1 and 2 illustrate a mechanical movement in which two parallel shafts 1 are driven in opposite directions from a common driving shaft 2, which is transverse to the shafts 1 and opposite the peripheries of the gears thereon. On each of the driven shafts is a driven gear 3 having peripheral buttress teeth 4, that is to say teeth whose working faces 5 are substantially perpendicular or radial and whose backs 6 slope from the tip of one tooth to the base of the next. The faces 5 are straight in the transverse direction, not slanting as in a worm wheel. The gears 3 are disposed in the same plane with their peripheries adjacent and their teeth reversed.

The driving member 7 on the shaft 2 is a double conical pinion projecting between the converging arcs of the gears 3. Each half of the pinion is formed with a conical spiral buttress thread 8 comprising a plurality of convolutions, in this instance three. These threads have a relatively steep spiral pitch and a relatively low helical pitch, the spiral pitch being the working pitch and the helical pitch enabling the spiral working face 9 to follow the gear teeth 4 in their curvilinear movement. Thus, each thread of the double pinion meshes at all times with a series of teeth on the corresponding gear. As will be perceived it is necessary that the spiral and helical pitches vary constantly throughout the thread, the one increasing as the other decreases, and that the working faces also vary constantly to conform to the successive inclinations of the working faces of the gear teeth. The law of the variation is determined by the positions of the gear teeth relative to the horizontal and vertical as they travel through the arc of engagement with the pinion, and can be readily ascertained.

Both parts of the double conical spiral pinion can be cut economically in one operation, insuring synchronism between the two sides of the mechanism, and because of the line contact it is not necessary that the centers be in exact relation, hence high efficiency is secured with low manufacturing cost.

What I claim as new is:

1. A mechanical movement, comprising a pair of oppositely rotatable buttress gears, and a double conical spiral buttress pinion meshing between the converging portions of the gears.

2. A mechanical movement, comprising a pair of oppositely rotatable parallel driven shafts, a pair of buttress gears thereon having their teeth reversed, a transverse driving shaft opposite the peripheries of the gears, and a double conical spiral buttress pinion meshing between the converging portions of the gears and having a constantly varying spiral pitch, a constantly varying lesser helical pitch, and a constantly varying working face angle.

JOHN C. KOPF.

Copies of this patent may be obtained for five cents each, by addressing the "Commissioner of Patents, Washington, D. C."